US012707167B2

(12) United States Patent
Do et al.

(10) Patent No.: US 12,707,167 B2

(45) Date of Patent: Aug. 11, 2026

(54) PIXEL ARCHITECTURE WITH REDUCED DARK CURRENT

(71) Applicant: Fairchild Imaging, Inc., San Jose, CA (US)

(72) Inventors: Hung T. Do, San Jose, CA (US); Stephen W. Mims, San Diego, CA (US); Khai Nguyen, Stockton, CA (US); Paul G. Lim, San Jose, CA (US)

(73) Assignee: FAIRCHILD IMAGING, INC., Wilmington, DE (US)

( * ) Notice: Subject to any disclaimer, the term of this patent is extended or adjusted under 35 U.S.C. 154(b) by 35 days.

(21) Appl. No.: 18/756,464

(22) Filed: Jun. 27, 2024

(65) Prior Publication Data

US 2026/0006349 A1 Jan. 1, 2026

(51) Int. Cl.

*H04N 25/77* (2023.01)
*H04N 25/709* (2023.01)
*H04N 25/78* (2023.01)

(52) U.S. Cl.

CPC ........... *H04N 25/77* (2023.01); *H04N 25/709* (2023.01); *H04N 25/78* (2023.01)

(58) Field of Classification Search

CPC ...... H04N 25/77; H04N 25/709; H04N 25/78; H04N 25/63; H04N 25/70; H04N 25/76; H04N 25/766

See application file for complete search history.

(56) References Cited

U.S. PATENT DOCUMENTS

| | | | | |
|---|---|---|---|---|
| 9,584,800 | B2 * | 2/2017 | Beck | G06T 7/80 |
| 10,200,644 | B2 | 2/2019 | Do et al. | |
| 2005/0128326 | A1 * | 6/2005 | Korthout | H04N 25/766 348/E3.018 |
| 2007/0103574 | A1 * | 5/2007 | Tanaka | H04N 25/00 348/308 |
| 2008/0143860 | A1 * | 6/2008 | Sato | H04N 25/77 348/E7.001 |
| 2009/0251576 | A1 * | 10/2009 | Hattori | H04N 25/76 348/294 |

(Continued)

OTHER PUBLICATIONS

Wang, et al., A 4M 1.4e noise, 96dB dynamic range, back side illuminated CMOS image sensor,"sensor", SPIE electronic imaging, (Feb. 2015). 4 pages.

*Primary Examiner* — Albert H Cutler

(74) *Attorney, Agent, or Firm* — Panitch Schwarze Belisario & Nadel LLP

(57) ABSTRACT

A given pixel of a pixel array is controlled to switch between operation modes to reduce dark current during charge transfer. The charge may be transferred from a sensing node at a gate terminal of a source follower. In an example, a mode select block is used to change the power voltage level applied to a terminal of the source follower prior to or during the charge transfer process. The mode select block includes a switch coupled between a power supply terminal and the source follower transistor and a reference transistor coupled between the power supply terminal and the source follower transistor. By activating the switch in the mode select block, the power delivered to the source follower can be reduced prior to or during the charge transfer process, which can pull down the voltage at the sensing node and reduce the dark current in the pixel.

17 Claims, 7 Drawing Sheets

(56) References Cited

U.S. PATENT DOCUMENTS

| | | | | |
|---|---|---|---|---|
| 2012/0049041 | A1* | 3/2012 | Ellis-Monaghan .... | H04N 25/57 250/208.1 |
| 2016/0014363 | A1* | 1/2016 | Kito ..................... | H04N 25/617 348/308 |
| 2020/0366860 | A1* | 11/2020 | Shishido ................ | H04N 25/78 |
| 2023/0112586 | A1* | 4/2023 | Ma ......................... | H04N 25/78 348/207.99 |
| 2024/0155259 | A1* | 5/2024 | Eshel ..................... | H04N 25/59 |
| 2025/0267376 | A1* | 8/2025 | Zhao .................... | H04N 25/616 |

* cited by examiner

PIXEL ARCHITECTURE WITH REDUCED DARK CURRENT

BACKGROUND

Image sensors are widely used for a number of different applications across a large portion of the electromagnetic spectrum. Many image sensor designs use an array of sensors to capture light across a given area. Each sensor may be considered a single pixel of the sensor array, with the pixels arranged in any number of rows and columns. Each pixel includes some form of photodetector as well as a circuit to collect the charge from the photodetector in response to a light input. A number of non-trivial issues exist with regard to the design of the circuit to provide both a high dynamic range and a high conversion gain.

Figure 1:
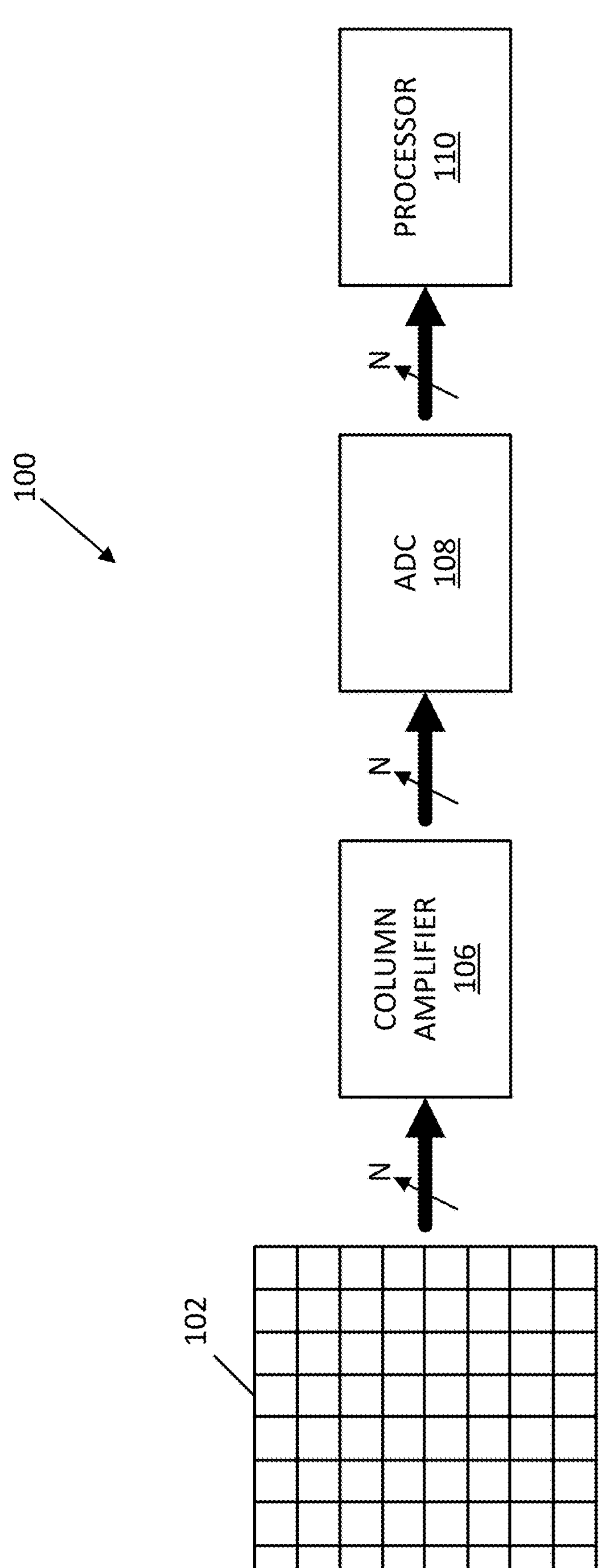
FIG. 1 is a block diagram of an image sensor that uses a pixel array, in accordance with an embodiment of the present disclosure.

These and other features of the present embodiments will be understood better by reading the following detailed description, taken together with the figures herein described.

DETAILED DESCRIPTION

Structures are disclosed for a given pixel of a pixel array that allows for the pixel to switch between operation modes to reduce dark current (a relatively small amount of electrical current flowing through imaging sensors when no photons are entering the sensor) during charge transfer. The charge may be transferred from a sensing node (SN) at a gate terminal of a source follower. Dark current increases if the voltage at SN is too high during the charge transfer process. According to some embodiments, a mode select block is used to change the power voltage level applied to the drain terminal of the source follower prior to or during the charge transfer process. The mode select block includes a switch coupled between a power supply terminal and the source follower transistor and a reference transistor coupled between the power supply terminal and the source follower transistor. By activating the switch in the mode select block, the power delivered to the source follower can be reduced prior to or during the charge transfer process, which can pull down the voltage at SN and reduce the dark current in the pixel.

GENERAL OVERVIEW

As previously noted, there are a number of non-trivial issues that remain with respect to designing a readout circuit for a photodetector. For example, it can be challenging to reduce the dark current when dealing with very low light levels. For example, the read noise in a photon counting application may be as low as 0.3e−. In such sensitive applications, it becomes important to reduce any noise contribution to the total read noise. For CMOS based image sensors, one of the dominant noise sources is the dark current at the sensing (SN) node. For sensors that operate in both low light environments for photon counting applications and high light environments for wide dynamic range applications, the SN node is reset to a high voltage (e.g., it cannot simply remain at a low voltage) in order to increase the voltage swing at the SN node. In addition, to reduce the image lag when the sensor operates in high light environments, the width of the charge transfer gate is often increased. Increasing the transfer gate width also increases the parasitic capacitance between the charge transfer gate and the SN node, which can further drive up the voltage on the SN node during activation of the charge transfer gate. Attempting to mitigate the coupling of this parasitic capacitance by using other capacitors in the circuit can reduce the conversion gain of the pixel readout circuit.

Thus, and in accordance with an embodiment of the present disclosure, techniques are disclosed for designing a readout circuit that can operate in a different mode during the charge transfer process to reduce the dark current at the sensing node SN. The gate terminal of a source follower transistor is coupled to SN and transfers the charge on SN towards a column amplifier or other bit-line amplifier. According to some embodiments, a mode select block is used to control the power delivered to the source follower. For example, the mode select block includes a switch coupled between a power supply terminal and the source follower transistor and a reference transistor coupled between the power supply terminal and the source follower transistor. In a first operation mode, the switch is closed to provide a rail power level (e.g., 2.5 V) to the source follower. However, in a second operation mode during the charge transfer from the transfer gate, the switch is open to provide a smaller power level (e.g., less than 1 V) to the source follower. The lower supplied voltage causes the source follower to operate in linear mode instead of saturation mode. In the linear mode, the voltages at both the source and drain terminals of the source follower are decreased compared to the saturation mode. This decrease in the voltage at the source follower also decreases the voltage at the SN node due to capacitive couplings between the SN node and the source and drain terminals of the source follower. During the charge transfer operation, the voltage on the SN node is increased as the charge transfer gate is activated. However, the increase in dark current is blunted since the voltage at the SN node was already brought to a lower level using the mode select block. The mode select block may control the operation of the source follower transistor of any number of pixels (such as pixels coupled together in given column of a pixel array). Other pixel-based imaging arrays may also benefit. Note that pixel and pixel circuit may be used interchangeably herein, for case and brevity of communication.

According to an example embodiment, an image sensor includes a plurality of pixels with at least one pixel of the plurality of pixels having a photodetector, a transfer gate coupled to an output of the photodetector, and a source follower transistor coupled to an output of the transfer gate. The image sensor also includes a mode select block coupled to the source follower transistor. The mode select block includes a switch coupled between a power supply terminal and the source follower transistor and a reference transistor coupled between the power supply terminal and the source follower transistor.

According to another example embodiment, an image sensor includes a pixel array having at least one column of addressable pixels, a column amplifier coupled to the at least one column of addressable pixels, an analog-to-digital converter (ADC) coupled to the column amplifier, and a processor coupled to the ADC. The at least one column of addressable pixels includes at least one pixel circuit that includes a photodetector, a transfer gate coupled to an output of the photodetector, and a source follower transistor coupled to an output of the transfer gate. The image sensor also includes a mode select block coupled to the source follower transistor. The mode select block includes a switch coupled between a power supply terminal and the source follower transistor and a reference transistor coupled between the power supply terminal and the source follower transistor.

According to another example embodiment, an image sensor includes a photodetector, a transfer gate having a first terminal coupled to an output of the photodetector, a source follower transistor having a gate terminal coupled to a second terminal of the transfer gate, a switch having a first terminal coupled to a power supply terminal and a second terminal coupled to a terminal of the source follower transistor, and a reference transistor having a first terminal coupled to the power supply terminal, a second terminal coupled to the terminal of the source follower transistor, and a gate terminal coupled to a reference voltage terminal.

The description uses the phrases “in an embodiment” or “in embodiments,” which may each refer to one or more of the same or different embodiments. Furthermore, the terms “comprising,” “including,” “having,” and the like, as used with respect to embodiments of the present disclosure, are synonymous.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

System Architecture

FIG. 1 is a block diagram of an example image sensor 100, according to some embodiments. Image sensor 100 may represent or be an integral part of a charge coupled device (CCD) camera or other type of imaging device. In some embodiments, image sensor 100 may be configured for capturing different portions of the electromagnetic spectrum, such as visible light, ultraviolet radiation, infrared radiation, or x-rays, to name a few examples. Image sensor 100 may include a pixel array 102, a column amplifier 106, an ADC 108, and a processor 110. Each of the illustrated components may be included together on same printed circuit board (PCB) or together in a single chip package (e.g., a system-in-package or system-on-chip). In some other embodiments, any one or more of the elements may be provided in a separate chip package and/or on separate PCBs.

According to some embodiments, pixel array 102 includes a plurality of pixels arranged in a row-column format. Each pixel of pixel array 102 may have a similar architecture that includes a photodetector and a readout circuit. The photo detection area of each pixel on which incident radiation may impinge may vary from one embodiment to the next, but in some example cases has a physical size of around 1 μm×1 μm up to around 5 μm×5 μm. Likewise, the shape and lensing (if present) of the photo detection area (e.g., photo diode) can also vary from one example to the next, depending on factors such as desired fill factor of the array. According to some embodiments, each row of pixels may be coupled together via a common row-select line (e.g., a wordline), to provide separately addressable rows of pixels.

According to some embodiments, the outputs from N different columns of pixels are received by column amplifier 106. According to some embodiments, column amplifier 106 represents N separate column amplifiers with a given column amplifier configured to receive the output from a corresponding column of pixels from pixel array 102. In this way, a given row of pixels from pixel array 102 can be selected via a row-select line and simultaneously read out via the N column amplifiers 106. According to some embodiments, column amplifier 106 may include any type of amplifier configuration, such as any number of source follower FETs or operational amplifiers. In some embodiments, a single column amplifier 106 may be used in conjunction with a multiplexer to receive each of the N column outputs from pixel array 102.

According to some embodiments, the output(s) from column amplifier 106 is/are received by ADC 108. As noted above, ADC 108 may represent N different ADCs with a given ADC configured to receive the output from a corresponding column amplifier 106. ADC 108 may be any known type of ADC without limitation.

Processor 110 may be configured to receive the digitized signal from ADC 108 (or N digitized signals across N ADCs) and perform any number of operations with the signal(s). For example, processor 110 may receive the signal data from a given row of pixels of pixel array 102 and use the signal data to create an image or a portion of an image captured via pixel array 102. As used herein, the term “processor” may refer to any device or portion of a device that processes electronic data from registers and/or memory to transform that electronic data into other electronic data that may be stored in registers and/or memory. Processor 110 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, custom-built semiconductor, or any other suitable processing devices.

Pixel Design

Figure 2:
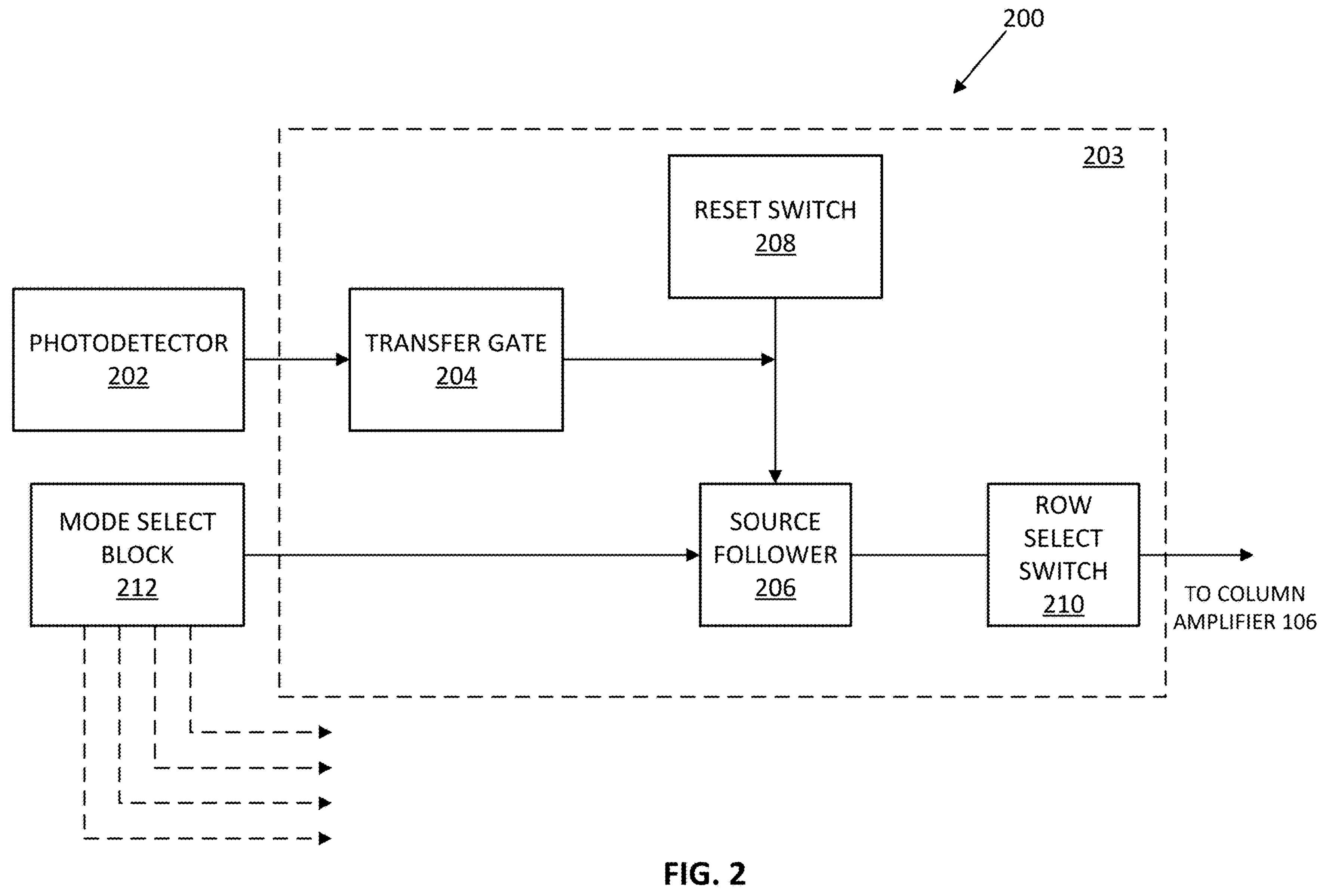
FIG. 2 is a block diagram illustrating the various components of a single pixel of the pixel array of FIG. 1, in accordance with an embodiment of the present disclosure.

FIG. 2 illustrates a block diagram of a pixel 200 from pixel array 102 that includes a photodetector 202 and a readout circuit 203, according to some embodiments. Photodetector 202 may include any type of photosensitive design, such as a PN diode. Note that the term pixel may refer to a functional pixel circuit and not just the photo detection area of a given pixel.

According to some embodiments, readout circuit 203 includes a transfer gate 204 coupled to an output of photodetector 202. As described above, the active area of the photodetector 202 (e.g., the area which is sensitive to impinging light and generates a corresponding signal based on intensity of that light), as well as any lensing, can vary depending on the given application. Transfer gate 204 acts like a gatekeeper to the charge generated by photodetector 202 in response to a light input. In some embodiments, transfer gate 204 may include a single field effect transistor (FET), such as a p-doped or n-doped metal oxide semiconductor device (PMOS or NMOS), or any number of FETs that carry out a similar function.

Transfer gate 204 is configured to allow charge from photodetector 202 to pass on to a sensing node. According to some embodiments, the sensing node is coupled to the gate of a source follower 206 to generate an output signal. Source follower 206 may be implemented, for example, as a single source-follower NMOS or PMOS device, or as an operational amplifier. According to some embodiments, the potential at the sensing node can be reset to a baseline or reference value via a reset switch 208.

According to some embodiments, a row select switch 210 is included within readout circuit 203. Row select switch 210 may have a gate or select input that is coupled to a common row-line (e.g., a wordline) with other pixels of the same row. Accordingly, when the current row is activated to read out from, row select switch 210 is activated and turned on to read out the output signal to column amplifier 106. When the current row is not selected, row select switch 210 is not active and no signal is read out to column amplifier 106. Row select switch 210 may be implemented as an NMOS or PMOS device with the row-line coupled to the gate of the NMOS or PMOS device.

According to some embodiments, a mode select block 212 is provided to control the operation of source follower 206. In some examples, mode select block 212 switches between at least a first mode and a second mode. In the first mode, a power rail voltage is applied to source follower 206, such that source follower 206 operates in the saturation region, and in the second mode, another voltage lower than the power rail voltage is applied to source follower 206, such that source follower 206 operates in the linear region, according to some embodiments. The dashed arrows from mode select block 212 are provided to indicate that mode select block 212 may be used to control the operation of any number of source follower transistors from any number of pixels, according to some embodiments. For example, a given column of pixels of pixel array 102 may all share a same mode select block 212 that controls the operation of each of the source followers from each pixel in the given column.

Figure 3:
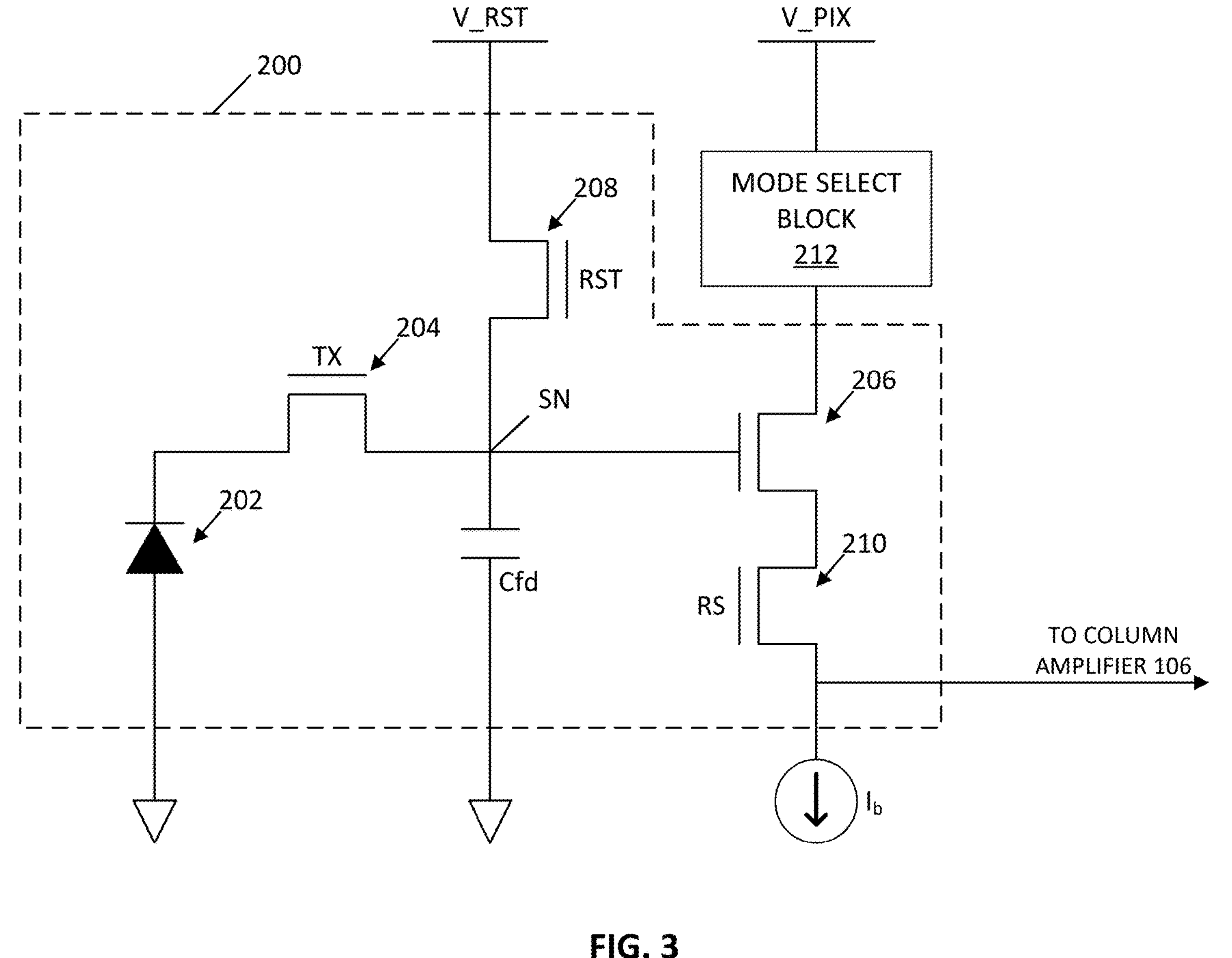
FIG. 3 is a schematic diagram illustrating the single pixel of FIG. 2, in accordance with an embodiment of the present disclosure.

FIG. 3 illustrates an example circuit schematic of mode select block 212 coupled to any given pixel 200 from pixel array 102, according to some embodiments. Each of the illustrated FETs may be either an NMOS or PMOS device depending on the layout. Additionally, in some embodiments, any of the FETs can be replaced with other transistor technologies, such as a bipolar junction transistor (BJT). According to some embodiments, the pixel readout circuit includes a current source In to provide a bias current for operating the source follower 206. In some embodiments, current source In provides the bias current for any number of pixels, such as pixels arranged together in a column of pixel array 102.

Light impinges upon a photodetector 202 where it is converted into electrical charge that can flow as a photocurrent. At a given moment in time, at least a portion of the converted charge is released onto a sensing node SN via a transfer gate 204 by turning transfer gate 204 on for a predefined number of clock cycles. Once the charge has been released to sensing node SN, it can be stored across any number of capacitors represented by $C_{fd}$, according to some embodiments. In some examples, the capacitance $C_{fd}$ merely represents the lumped parasitic capacitance at sensing node SN.

As noted above, the potential at sensing node SN can be reset to a baseline or reference value via reset switch 208. When reset switch 208 is biased on, the rail voltage V_RST is applied to sensing node SN and/or any number of other nodes coupled to the end of reset switch 208. The rail voltage V_RST may be between about 2 V and about 2.5 V.

The stored potential at SN activates the source follower 206 to produce an output signal to send to column amplifier 106. Source follower 206 may be a single FET device or any other amplifier structure, such as an operational amplifier. The output signal produced from source follower 206 can only be sent on to column amplifier 106 if a row select switch 210 is biased on. According to some such examples, all pixels in a given row of pixel array 102 will share a same row select line (e.g., a word line) that couples with the gate of row select switch 210. If row select switch 210 is biased off, then the current pixel is part of a row that is not currently being read from and no signal will be sent on to column amplifier 106 from the current pixel.

Source follower 206 may be powered, for example, via an output from mode select block 212. According to some embodiments, mode select block 212 is designed to either deliver the rail voltage V_PIX to source follower 206 (e.g., a first mode of operation), or an intermediate voltage $V_1$ that is less than V_PIX (e.g., a second mode of operation). In some examples, V_PIX is between 2 V and 3 V and intermediate voltage $V_1$ is between 0.5 V and 1.5 V. In one particular example, V_PIX is 2.5 V and the intermediate voltage $V_1$ is about 0.7 V. According to some embodiments, source follower 206 operates in the saturation mode when receiving V_PIX and operates in the linear mode when receiving the intermediate voltage $V_1$. According to some embodiments, mode select block 212 includes a switch to change between delivering V_PIX or delivering $V_1$ to source follower 206. Mode select block 212 may be designed to deliver $V_1$ to source follower 206 during a charge transfer operation (e.g., while transfer gate 204 is active), and to deliver V_PIX to source follower 206 during times outside of the charge transfer operation.

Figure 4:
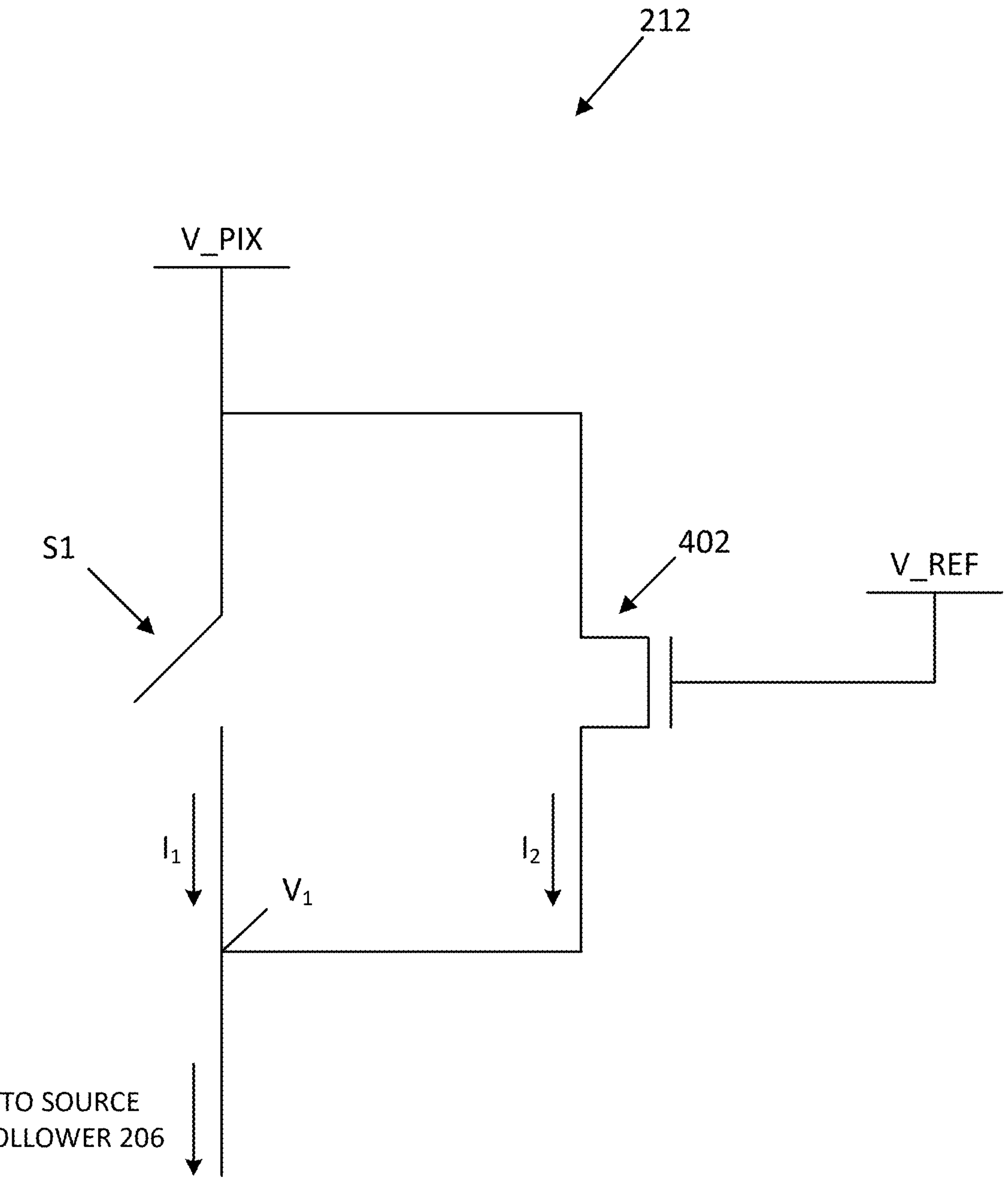
FIG. 4 is a schematic diagram of a mode select block, in accordance with an embodiment of the present disclosure.

FIG. 4 illustrates an example circuit schematic of mode select block 212, according to some embodiments. As noted above, mode select block 212 includes a switch S1 in parallel with a reference transistor 402. Switch S1 has a first terminal coupled to the voltage rail terminal V_PIX and a second terminal coupled to the intermediate voltage node $V_1$, while reference transistor 402 has a first terminal coupled to the voltage rail terminal V_PIX and a second terminal coupled to the intermediate voltage node $V_1$. According to some embodiments, the intermediate voltage node $V_1$ is coupled to a terminal of source follower 206 (e.g., source or drain terminal of source follower 206).

According to some embodiments, the state of switch S1 determines the voltage level provided to the source or drain terminal of source follower 206. When switch S1 is closed, reference transistor 402 is bypassed and the rail voltage V_PIX is provided to source follower 206. However, when switch S1 is opened, a new intermediate voltage $V_1$ that is less than V_PIX is provided to source follower 206. The gate of reference transistor 402 may be controlled by a programmable reference voltage V_REF that is less than V_PIX. In some examples, V_REF is between 1 V and 2 V. In some embodiments, the intermediate voltage $V_1$ is equal to the difference between the gate potential (V_REF) of reference transistor 402 and the threshold voltage of reference transistor 402. In some embodiments, the difference between V_REF and $V_1$ is greater than the threshold voltage of reference transistor 402. When switch S1 is opened, the current $I_1$ becomes zero and the current $I_2$ becomes equal to the bias current $I_b$ through the source follower 206, according to some embodiments. Reference transistor 402 may be an NMOS or PMOS device with the appropriate V_REF value depending on the application.

As noted above, $V_1$ has a lower potential compared to V_PIX. In this way, the state of switch S1 controls whether source follower 206 receives a higher voltage (V_PIX) or a lower voltage ($V_1$), which in turn determines its operation state (e.g., saturation mode or linear mode).

Figure 5:
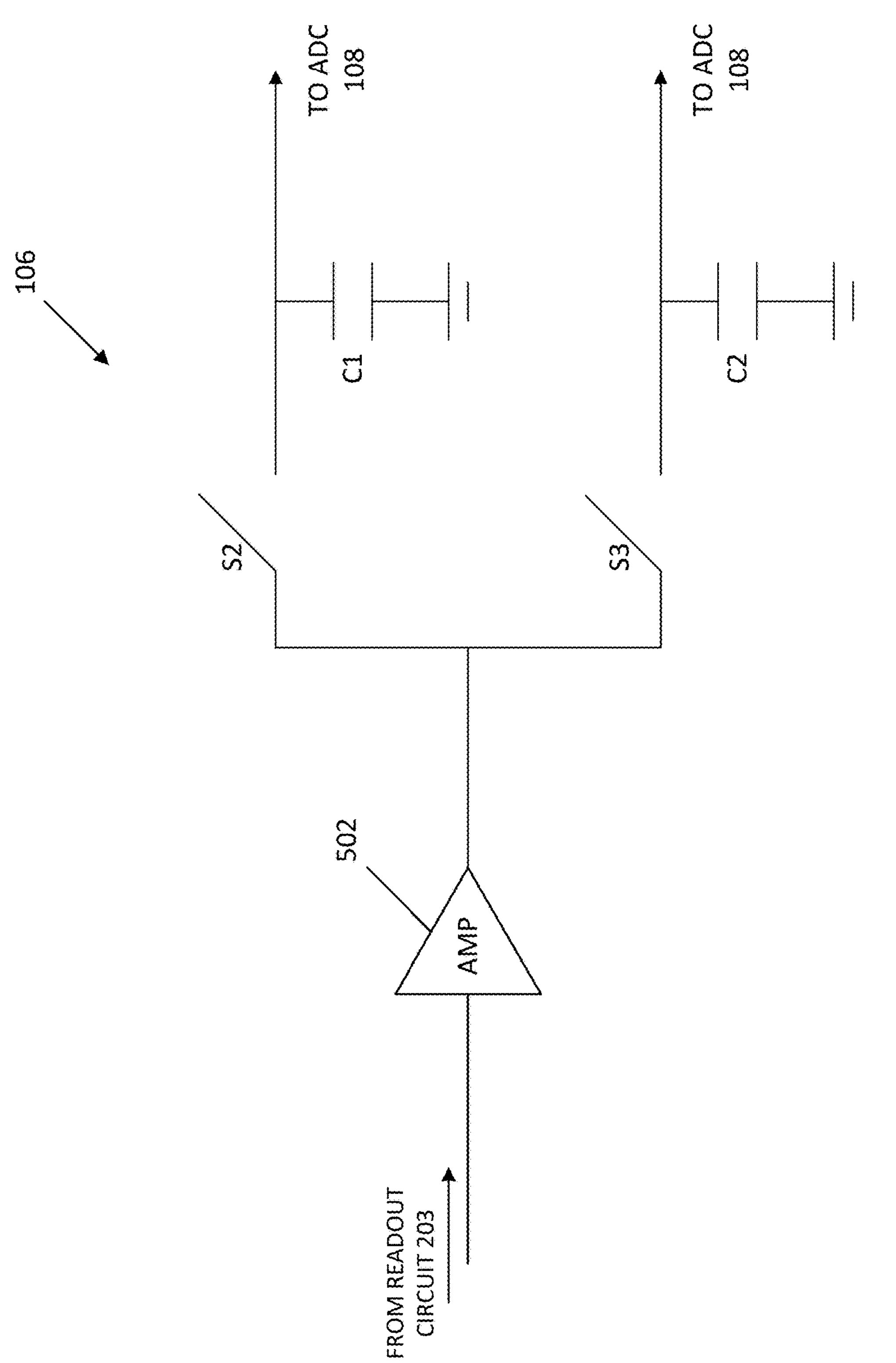
FIG. 5 is a schematic diagram of a column amplifier circuit, in accordance with an embodiment of the present disclosure.

FIG. 5 illustrates an example circuit schematic of column amplifier 106, according to some embodiments. The charge received from readout circuit 203 (e.g., during a charge transfer operation from a photodiode), is provided as a photocurrent that is amplified by an amplifier 502, such as an operation amplifier, before being passed to either a first capacitor C1 and/or a second capacitor C2 depending on the switch state of switches S2 and S3, respectively. Charge may be stored on either or both capacitors C1 and C2, and subsequently discharged to ADC 108 upon opening the corresponding switch S2 or S3, respectively. According to some embodiments, C1 may be used to capture a baseline measurement (e.g., before photodiode charge transfer) and C2 may be used to capture a light measurement (e.g., after photodiode charge transfer), and the two may be compared by ADC 108 to determine the level of light impinging upon the photodetector.

Timing Diagram for Pixel Circuit Operation

Figure 6:
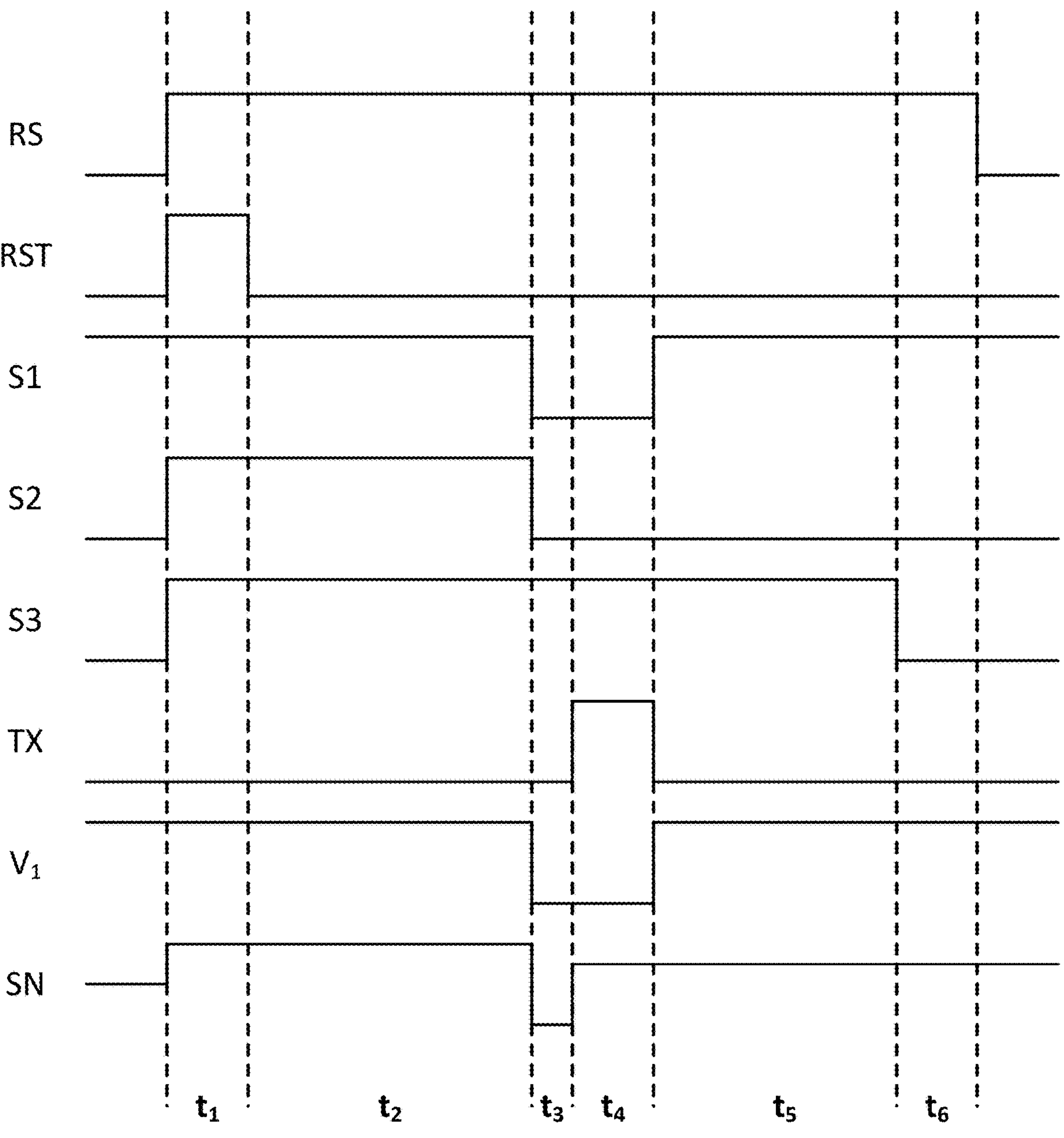
FIG. 6 is a timing diagram for various signals that control certain elements of the pixel circuit of FIG. 3, in accordance with an embodiment of the present disclosure.

FIG. 6 provides an example timing diagram for various signals of a pixel circuit. RS represents the logic state of the signal at the gate of row select switch 210, RST represents the logic state of the signal at the gate of reset switch 208, each of S1, S2, and S3 represent the logic state of the corresponding switches S1, S2, and S3, TX represents the logic state of the signal the gate of transfer gate 204, $V_1$ represents the voltage level at the output of mode select block 212, and SN represents the voltage level at the sensing node SN.

During a first time period $t_1$, the pixel circuit is initialized to reset the potential at various nodes, such as at sensing node SN. During this time, RST is biased on and S2, S3 and RS are also biased on for at least one clock cycle. In this way, the potential at SN is reset with the rail voltage V_RST to some baseline value. Additionally, the closing of switches S2 and S3 charges capacitors C1 and C2 with a baseline charge reading (e.g., before light is collected). Note also during this time that switch S1 is closed such that the potential at V1 is high (e.g., equal to the rail voltage V_PIX).

At a second time period $t_2$, RST is biased off and some time passes (e.g., any number of clock cycles) to allow light to be collected and built up at transfer gate 204. According to some embodiments, at a third time period $t_3$ and before transfer gate 204 is biased on, switch S1 is biased off. This drops the voltage at $V_1$ down to some intermediate level that is less than the rail voltage V_PIX. For example, $V_1$ may drop from around 2.5 volts to around 0.7 V depending on the characteristics of reference transistor 402 and the value of V_REF. Reducing the voltage that is applied to source follower 206 causes source follower 206 to operate in the linear region and pulls down the voltage at its gate (e.g., sensing node SN), as observed in the timing diagram during time period $t_3$. During this time period, switch S2 is opened to discharge the baseline charge measurement from capacitor C1 to ADC 108. Switch S3 remains closed to capture the measurement charge at a later time, according to some embodiments.

At a fourth time period $t_4$, photodetector charge is released onto sensing node SN by biasing on transfer gate 204. Note that switch S1 remains off during time period $t_4$ so source follower 206 continues to operate in the linear region. The potential at SN increases due to the transfer of photocharge, however, the potential does not rise above its baseline potential (e.g., set during time period $t_1$) as it was brought down during time period $t_3$. This in turn helps to reduce the dark current during this charge transfer process.

At a fifth time period $t_5$, transfer gate 204 is biased off and switch S1 is closed to return the potential at V1 to the rail voltage V_PIX. This also causes source follower 206 to return to operating in the saturation mode, according to some embodiments. During this time, the potential at column amplifier 106 represents the measured charge from the light collection and is stored across capacitor C2 since switch S3 is closed while switch S2 is open. At a sixth time period $t_6$, switch S3 is opened to discharge the measurement charge from capacitor C2 to ADC 108. If no further readings are to be taken from the pixel, RS may be biased off following time period to. In some examples, further light readings are to be taken from the pixel, such that the process of time periods $t_1$-$t_6$ repeats itself.

According to some embodiments, the baseline readings are compared to the signal readings to capture the difference associated with the amount of light impinging upon photodetector PD. For example, the baseline reading captured at time period $t_3$ is compared to the signal reading captured at time period to.

Example Computing Platform

Figure 7:
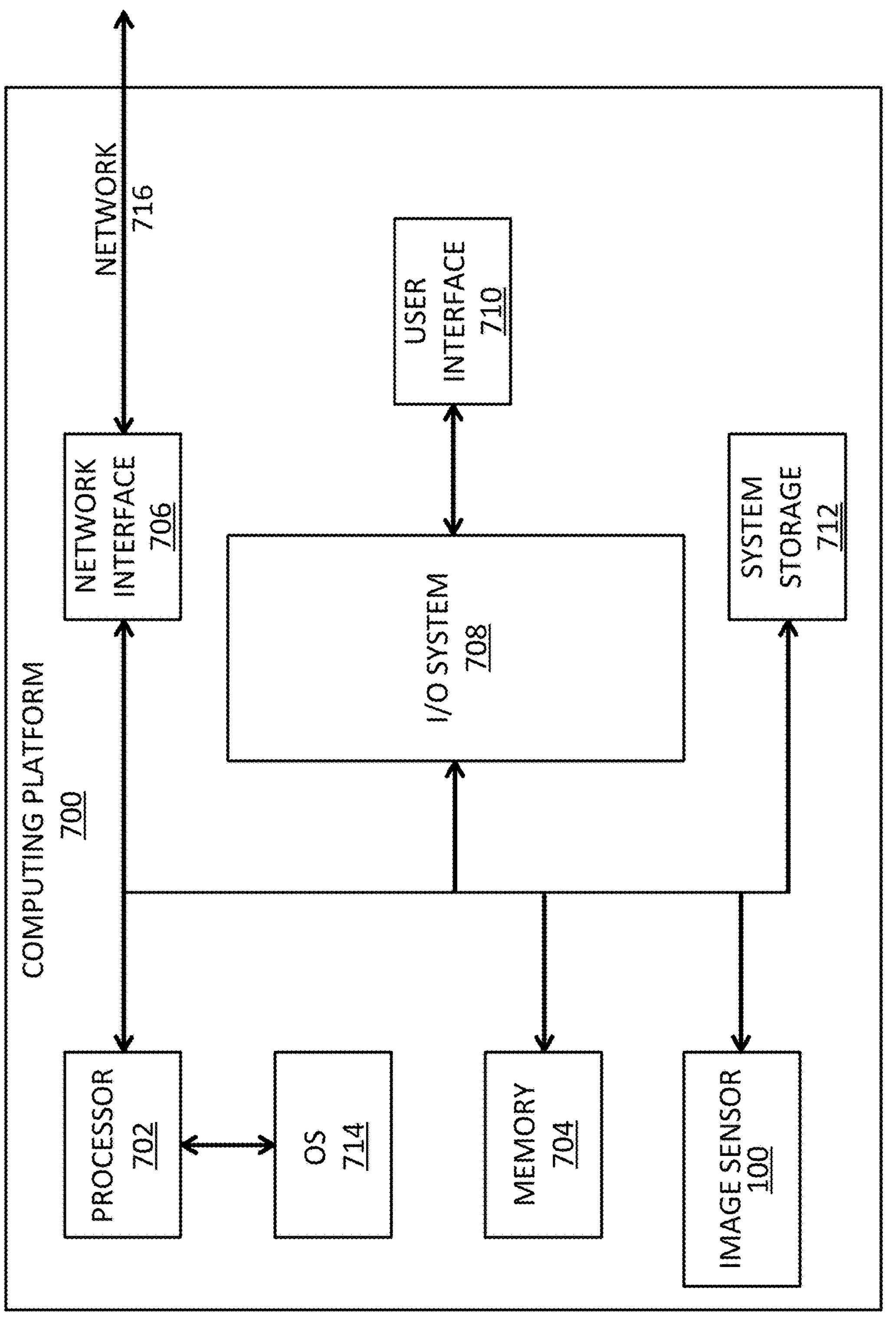
FIG. 7 illustrates an example computing platform that may include the image sensor of FIG. 1, in accordance with an embodiment of the present disclosure.

FIG. 7 illustrates an example computing platform 700 that interfaces with image sensor 100, configured in accordance with certain embodiments of the present disclosure. In some embodiments, computing platform 700 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments.

In some embodiments, computing platform 700 may comprise any combination of a processor 702, a memory 704, image sensor 100, a network interface 706, an input/output (I/O) system 708, a user interface 710, and a storage system 712. In some embodiments, one or more components of image sensor 100 are implemented as part of processor 702. As can be further seen, a bus and/or interconnect is also provided to allow for communication between the various components listed above and/or other components not shown. Computing platform 700 can be coupled to a network 716 through network interface 706 to allow for communications with other computing devices, platforms, or resources. Other componentry and functionality not reflected in the block diagram of FIG. 7 will be apparent in light of this disclosure, and it will be appreciated that other embodiments are not limited to any particular hardware configuration.

Processor 702 can be any suitable processor and may include one or more coprocessors or controllers to assist in control and processing operations associated with computing platform 700. In some embodiments, processor 702 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Memory 704 can be implemented using any suitable type of digital storage including, for example, flash memory and/or random access memory (RAM). In some embodiments, memory 704 may include various layers of memory hierarchy and/or memory caches as are known to those of skill in the art. Memory 704 may be implemented as a volatile memory device such as, but not limited to, a RAM, dynamic RAM (DRAM), or static RAM (SRAM) device. Storage system 712 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 712 may comprise technology to increase the storage performance enhanced protection for valuable digital media when multiple hard drives are included.

Processor 702 may be configured to execute an Operating System (OS) 714 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with computing platform 700, and therefore may also be implemented using any suitable existing or subsequently-developed platform.

Network interface 706 can be any appropriate network chip or chipset which allows for wired and/or wireless connection between other components of computing platform 700 and/or network 716, thereby enabling computing platform 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 708 may be configured to interface between various I/O devices and other components of computing platform 700. I/O devices may include, but not be limited to, a user interface 710. User interface 710 may include devices (not shown) such as a display element, touchpad, keyboard, mouse, and speaker, etc. I/O system 708 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 702 or any chipset of computing platform 700.

It will be appreciated that in some embodiments, the various components of the computing platform 700 may be combined or integrated in a system-on-a-chip (SoC) architecture. In some embodiments, the components may be hardware components, firmware components, software components or any suitable combination of hardware, firmware or software.

In various embodiments, computing platform 700 may be implemented as a wireless system, a wired system, or a combination of both. When implemented as a wireless system, computing platform 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, GPUs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

FURTHER EXAMPLE EMBODIMENTS

The following examples pertain to further embodiments, from which numerous permutations and configurations will be apparent.

Example 1 is an image sensor that includes a plurality of pixels. At least one pixel of the plurality of pixels includes a photodetector, a transfer gate coupled to an output of the photodetector, and a source follower transistor coupled to an output of the transfer gate. The image sensor also includes a switch coupled between a power supply terminal and the source follower transistor, and a reference transistor coupled between the power supply terminal and the source follower transistor.

Example 2 includes the image sensor of Example 1, wherein the transfer gate, source follower transistor, and reference transistor are all field effect transistors (FETs).

Example 3 includes the image sensor of Example 1 or 2, further comprising a reset switch coupled between the output of the transfer gate and a reset voltage terminal.

Example 4 includes the image sensor of any one of Examples 1-3, further comprising a capacitor coupled between a ground terminal and the output of the transfer gate.

Example 5 includes the image sensor of any one of Examples 1-4, wherein a gate of the reference transistor is coupled to a reference voltage terminal.

Example 6 includes the image sensor of Example 5, wherein the reference voltage terminal has a lower voltage compared to the power supply terminal.

Example 7 includes the image sensor of any one of Examples 1-6, wherein the source follower transistor operates in a saturation mode when the switch is closed, and the source follower transistor operates in a linear mode when the switch is open.

Example 8 includes the image sensor of any one of Examples 1-7, further comprising a pixel select switch coupled to the source follower transistor.

Example 9 is an image sensor that includes a pixel array having at least one column of addressable pixels, a column amplifier coupled to the at least one column of addressable pixels, an analog-to-digital converter (ADC) coupled to the column amplifier, a processor coupled to the ADC, and a mode select block. The at least one column of addressable pixels includes at least one pixel that includes a photodetector, a transfer gate coupled to an output of the photodetector, and a source follower transistor coupled to an output of the transfer gate. The mode select block includes a switch coupled between a power supply terminal and the source follower transistor, and a reference transistor coupled between the power supply terminal and the source follower transistor.

Example 10 includes the image sensor of Example 9, wherein the transfer gate, source follower transistor, and reference transistor are all field effect transistors (FETs).

Example 11 includes the image sensor of Example 9 or 10, wherein the at least one pixel further comprises a reset switch coupled between the output of the transfer gate and a reset voltage terminal.

Example 12 includes the image sensor of any one of Examples 9-11, wherein the at least one pixel further comprises a capacitor coupled between a ground terminal and the output of the transfer gate.

Example 13 includes the image sensor of any one of Examples 9-12, wherein a gate of the reference transistor is coupled to a reference voltage terminal.

Example 14 includes the image sensor of Example 13, wherein the reference voltage terminal has a lower voltage compared to the power supply terminal.

Example 15 includes the image sensor of any one of Examples 9-14, wherein the source follower transistor operates in a saturation mode when the switch is closed, and the source follower transistor operates in a linear mode when the switch is open.

Example 16 includes the image sensor of any one of Examples 9-15, wherein the at least one pixel further comprises a pixel select switch coupled to the source follower transistor.

Example 17 includes the image sensor of any one of Examples 9-16, wherein the mode select block is coupled to each pixel of the at least one column of addressable pixels.

Example 18 is an image sensor that includes a photodetector, a transfer gate having a first terminal coupled to an output of the photodetector, a source follower transistor having a gate terminal coupled to a second terminal of the transfer gate, a switch having a first terminal coupled to a power supply terminal and a second terminal coupled to a terminal of the source follower transistor, and a reference transistor having a first terminal coupled to the power supply terminal, a second terminal coupled to the terminal of the source follower transistor, and a gate terminal coupled to a reference voltage terminal.

Example 19 includes the image sensor of Example 18, wherein the transfer gate, source follower transistor, and reference transistor are all field effect transistors (FETs).

Example 20 includes the image sensor of Example 18 or 19, further comprising a reset switch having a first terminal coupled to a reset voltage terminal and a second terminal coupled to the second terminal of the transfer gate.

Example 21 includes the image sensor of any one of Examples 18-20, further comprising a capacitor coupled between a ground terminal and the second terminal of the transfer gate.

Example 22 includes the image sensor of any one of Examples 18-21, wherein the reference voltage terminal has a lower voltage compared to the power supply terminal.

Example 23 includes the image sensor of any one of Examples 18-22, wherein the source follower transistor operates in a saturation mode when the switch is closed, and the source follower transistor operates in a linear mode when the switch is open.

Example 24 includes the image sensor of any one of Examples 18-23, wherein the terminal of the source follower transistor is a first terminal, and the image sensor further comprises a pixel select switch coupled to a second terminal of the source follower transistor.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. An image sensor, comprising:

a plurality of pixels, wherein at least one pixel of the plurality of pixels comprises a photodetector, a transfer gate coupled to an output of the photodetector, and a source follower NMOS transistor coupled to an output of the transfer gate;

a switch coupled between a power supply terminal and a drain terminal of the source follower transistor; and an NMOS reference transistor having a drain terminal coupled to the power supply terminal and a source terminal coupled to the drain terminal of the source follower transistor, wherein the source follower NMOS transistor operates in a saturation mode when the switch is closed, and the source follower NMOS transistor operates in a linear mode when the switch is open.

2. The image sensor of claim 1, wherein the transfer gate, source follower transistor, and reference transistor are all field effect transistors (FETs).

3. The image sensor of claim 1, further comprising a reset switch coupled between the output of the transfer gate and a reset voltage terminal.

4. The image sensor of claim 1, wherein a gate of the reference transistor is coupled to a reference voltage terminal.

5. The image sensor of claim 4, wherein the reference voltage terminal has a lower voltage compared to the power supply terminal.

6. The image sensor of claim 1, further comprising a pixel select switch coupled to a source terminal of the source follower transistor.

7. An image sensor, comprising:

a pixel array having at least one column of addressable pixels;

a column amplifier coupled to the at least one column of addressable pixels;

an analog-to-digital converter (ADC) coupled to the column amplifier;

a processor coupled to the ADC; and a mode select block;

wherein the at least one column of addressable pixels includes at least one pixel that comprises:

a photodetector, a transfer gate coupled to an output of the photodetector, and a source follower NMOS transistor coupled to an output of the transfer gate;

wherein the mode select block comprises:

a switch coupled between a power supply terminal and a drain terminal of the source follower transistor, and an NMOS reference transistor having a drain terminal coupled to the power supply terminal and a source terminal coupled to the drain terminal of the source follower transistor, wherein the source follower NMOS transistor operates in a saturation mode when the switch is closed, and the source follower NMOS transistor operates in a linear mode when the switch is open.

8. The image sensor of claim 7, wherein the transfer gate, source follower transistor, and reference transistor are all field effect transistors (FETs).

9. The image sensor of claim 7, wherein the at least one pixel further comprises a reset switch coupled between the output of the transfer gate and a reset voltage terminal.

10. The image sensor of claim 7, wherein a gate of the reference transistor is coupled to a reference voltage terminal.

11. The image sensor of claim 10, wherein the reference voltage terminal has a lower voltage compared to the power supply terminal.

12. The image sensor of claim 7, wherein the mode select block is coupled to each pixel of the at least one column of addressable pixels.

13. An image sensor comprising:

a photodetector;

a transfer gate having a first terminal coupled to an output of the photodetector;

a source follower NMOS transistor having a gate terminal coupled to a second terminal of the transfer gate;

a switch having a first terminal coupled to a power supply terminal and a second terminal coupled to a drain terminal of the source follower transistor; and an NMOS reference transistor having a drain terminal coupled to the power supply terminal, a source terminal coupled to the drain terminal of the source follower transistor, and a gate terminal coupled to a reference voltage terminal, wherein the source follower NMOS transistor operates in a saturation mode when the switch is closed, and the source follower NMOS transistor operates in a linear mode when the switch is open.

14. The image sensor of claim 13, wherein the transfer gate, source follower transistor, and reference transistor are all field effect transistors (FETs).

15. The image sensor of claim 13, further comprising a reset switch having a first terminal coupled to a reset voltage terminal and a second terminal coupled to the second terminal of the transfer gate.

16. The image sensor of claim 13, wherein the reference voltage terminal has a lower voltage compared to the power supply terminal.

17. The image sensor of claim 13, wherein the image sensor further comprises a pixel select switch coupled to a source terminal of the source follower transistor.

* * * * *